US006592051B1

(12) United States Patent
Natsu et al.

(10) Patent No.: US 6,592,051 B1
(45) Date of Patent: Jul. 15, 2003

(54) MIST FEEDER (75) Inventors: Wataru Natsu, Kawasaki (JP); Takeshi Kamima, Yokohama (JP)

(73) Assignee: Kuroda Seiko Co., Ltd., Kawasaki (JP)

( * ) Notice: Subject to any disclaimer, the term of this patent is extended or adjusted under 35 U.S.C. 154(b) by 0 days.

(21) Appl. No.: 09/762,705
(22) PCT Filed: Aug. 12, 1999
(86) PCT No.: PCT/JP99/04368

§ 371 (c)(1), (2), (4) Date: Feb. 12, 2001

(87) PCT Pub. No.: WO00/09937
PCT Pub. Date: Feb. 24, 2000

(30) Foreign Application Priority Data

| | | |
|---|---|---|
| Aug. 14, 1998 | (JP) | 10-229873 |
| Oct. 27, 1998 | (JP) | 10-305086 |
| Nov. 30, 1998 | (JP) | 10-338628 |
| Apr. 16, 1999 | (JP) | 11-110066 |

(51) Int. Cl.$^{7}$ .......... B05B 9/00
(52) U.S. Cl. .......... 239/124; 239/311
(58) Field of Search .......... 239/124, 127, 239/310, 311, 314, 462

(56) References Cited

U.S. PATENT DOCUMENTS 3,506,589 A 4/1970 Hoffman

FOREIGN PATENT DOCUMENTS

| | | |
|---|---|---|
| JP | 5833359 | 7/1983 |
| JP | 3-48479 | 10/1991 |
| JP | 6-58491 | 3/1994 |

*Primary Examiner*—Lisa A. Douglas
(74) *Attorney, Agent, or Firm*—Varndell & Varndell, PLLC (57) ABSTRACT

An inner tank 6 is arranged on a partition plate 2 in a main tank 1, and a spray nozzle 8 is provided in a top wall of the inner tank 6. A mist separator 33 is formed by a helical tube wound around an outer wall of the inner tank 6. An upper port 33*a* of the mist separator 33 is connected to a connector block 32 provided at an upper portion of the inner tank 6 and a lower port 33*b* is positioned at a lower portion of a main mist chamber 5. Smaller particles in a primary mist produced by the spray nozzle 8 float in an upper portion of an inner mist chamber 7. Larger particles in the primary mist descend toward a lower portion of the inner mist chamber 7, and these particles adhere onto an inner wall of the inner tank 6 to form a secondary mist consisting of the smaller particles. The secondary mist is subjected to acceleration and centrifugal force during a passage through the mist separator 33, where the larger particles in the secondary mist adhere onto an inner wall of the mist separator, and the main mist chamber is filled with a tertiary mist consisting of smaller particles.

17 Claims, 13 Drawing Sheets

MIST FEEDER

TECHNICAL FIELD

The present invention relates to a mist supply apparatus for supplying mist which may be used for lubricating and cooling a working point or working site in a machine tool.

TECHNICAL BACKGROUND

In general, when a work is treated by a machine tool, it is necessary to spray or eject a large amount of oil to a working site for lubrication and cooling. In this case, the oil is sprayed to a working site by means of oil conduits formed within a main spindle of a machine tool and a tool or the oil is directly sprayed to a working site without being passed through the oil conduits.

In either cases, since the liquid oil is sprayed to a working site, a large amount of oil spreads around the working site. This results in an undesired waste of oil and a serious problem of environment pollution. In general, the oil is reused by circulation and therefore it is necessary to provide an oil cooling means in a circulation path. Moreover, even though the oil is cooled, bacillus might be produced in the oil and the oil might be subjected to contamination and corrosion.

In order to solve such a problem, recently there has been proposed a minimum quantity lubrication (MQL) system, in which a small amount of oil is sprayed to a working site as an oil mist. This system has been practically used in certain applications. In a mist supply apparatus for use in the system of the kind mentioned above, oil and air are supplied to a two-fluid nozzle under compression to produce an oil mist, the thus produced oil mist is once stored in a mist chamber, and the oil mist stored in the mist chamber is supplied to a machine tool. The oil is supplied to the nozzle by means of a pump, and a given amount of the oil is supplied intermittently by driving a plunger of the pump in a reciprocal manner. A total amount of the oil supplied to the nozzle is controlled in accordance with the number of reciprocal movements of the plunger.

DISCLOSURE OF THE INVENTION

In known oil supply apparatuses, a mist containing both larger particles and smaller particles in combination is supplied. Therefore, when the mist is directly supplied to a working site, no problem occurs, but when the mist is supplied to a working site by means of mist conduits formed in a main spindle of a machine tool and a tool, larger mist particles are liable to be adhered onto an inner wall of the mist passage formed in the main spindle due to centrifugal force produced by a high speed rotation of the main spindle. This results in that an amount of mist actually supplied to the working site becomes smaller than a total amount of supplied mist. Then, lubrication faculty and cooling faculty of the machine tool are decreased, and working efficiency might be decreased. Furthermore, after the rotation of the main spindle is stopped, oil adhered on the inner walls of the oil conduits formed in the main spindle and tool might be dropped onto a work piece. In this manner, the work piece is stained with oil and the environment pollution might occur.

Furthermore, since a given amount of oil is supplied by the reciprocal pump in an intermittent manner, when a large amount of oil is sprayed abruptly, an excess amount of oil could not be converted into a mist, and liquid oil might be circulated. In this case, a concentration of the mist is decreased. Therefore, the known mist supply apparatus could not be effectively applied to machine tools for drilling deep holes and tapping.

In a machining center, tools are automatically exchanged and a mist is supplied to working site through mist conduits formed in a main spindle and a tool. When the known mist supply apparatus is applied to such a machining center, since mist conduits formed in tools have different diameters, a flow rate and a pressure of a mist sprayed to the working site are changed. For instance, when a tool having a mist conduit of a smaller diameter is used, although a mist pressure is increased and chips produced by cutting can be effectively removed, but a flow rate of the mist is decreased and lubricating and cooling faculties are decreased. When a tool having a mist conduit of a larger diameter is used, a flow rate of the mist is increased and sufficient lubricating and cooling faculties can be obtained, but a faculty of removing chips is decreased due to a decrease in the mist pressure.

The present invention has for its object to provide a mist supply apparatus which can overcome the above mentioned problems by supplying a mist containing mainly larger particles having a uniform size.

It is another object of the invention to provide a mist supply apparatus, in which a mist pressure can be maintained at a given value or can be increased temporarily.

It is still another object of the present invention to provide a mist supply apparatus which can supply a mist with a suitable concentration.

According to the invention, a mist supply apparatus comprising a liquid tank for containing a liquid, an atomizing means for atomizing said liquid to produce a mist of said liquid, and a transporting means for transporting said mist produced by said atomizing means to a mist supply port, wherein the apparatus further comprises a first separating means consisting of a space for containing a primary mist produced by said atomizing means and for separating larger particles in the primary mist by depositing the larger particles on an inner wall defining said space of the first separating means, and a second separating means consisting of a helical tube conduit arranged to surround said first separating means and conducting a secondary mist produced by said first separating means and for separating larger particles contained in the secondary mist by depositing the large particles on an inner wall of said tubular body of the second separating means.

According to another aspect of the invention, a mist supply apparatus comprising a liquid tank for containing a liquid, an atomizing means for atomizing said liquid from said liquid tank by means of a gas from a compressed gas supply source to produce mist of said liquid, and a mist chamber for containing said mist produced by said atomizing means, wherein a pressure control means is connected between said compressed gas supply source and set and said atomizing means for controlling a pressure within said mist chamber.

According to further aspect of the invention, a mist supply apparatus comprising a liquid tank for containing a liquid, an atomizing means for atomizing said liquid from said liquid tank by means of a gas from a compressed gas supply source to produce mist of said liquid, and a mist chamber for containing the mist produced by said atomizing means, wherein a sub-tank for containing the liquid is provided in a liquid conduit for atomizing means by means of a pump, and the liquid is continuously flowed between said sub-tank and said atomizing means.

BEST MODE OF THE INVENTION

Now the present invention will be explained in detail with reference to embodiments shown in the drawings.

Figure 1:
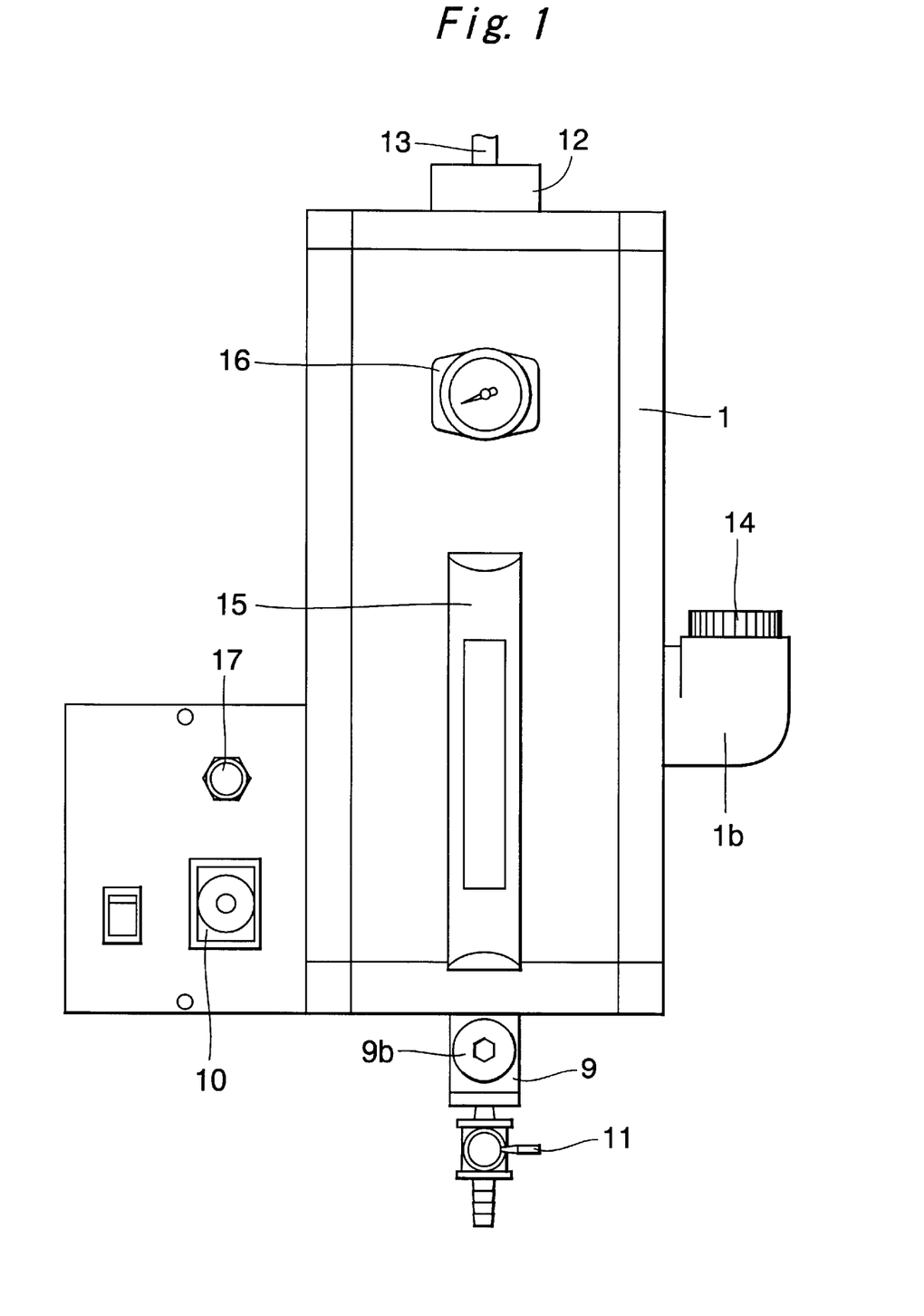
FIG. 1 is a front view showing a first embodiment of the mist supply apparatus according to the invention.
Figure 2:
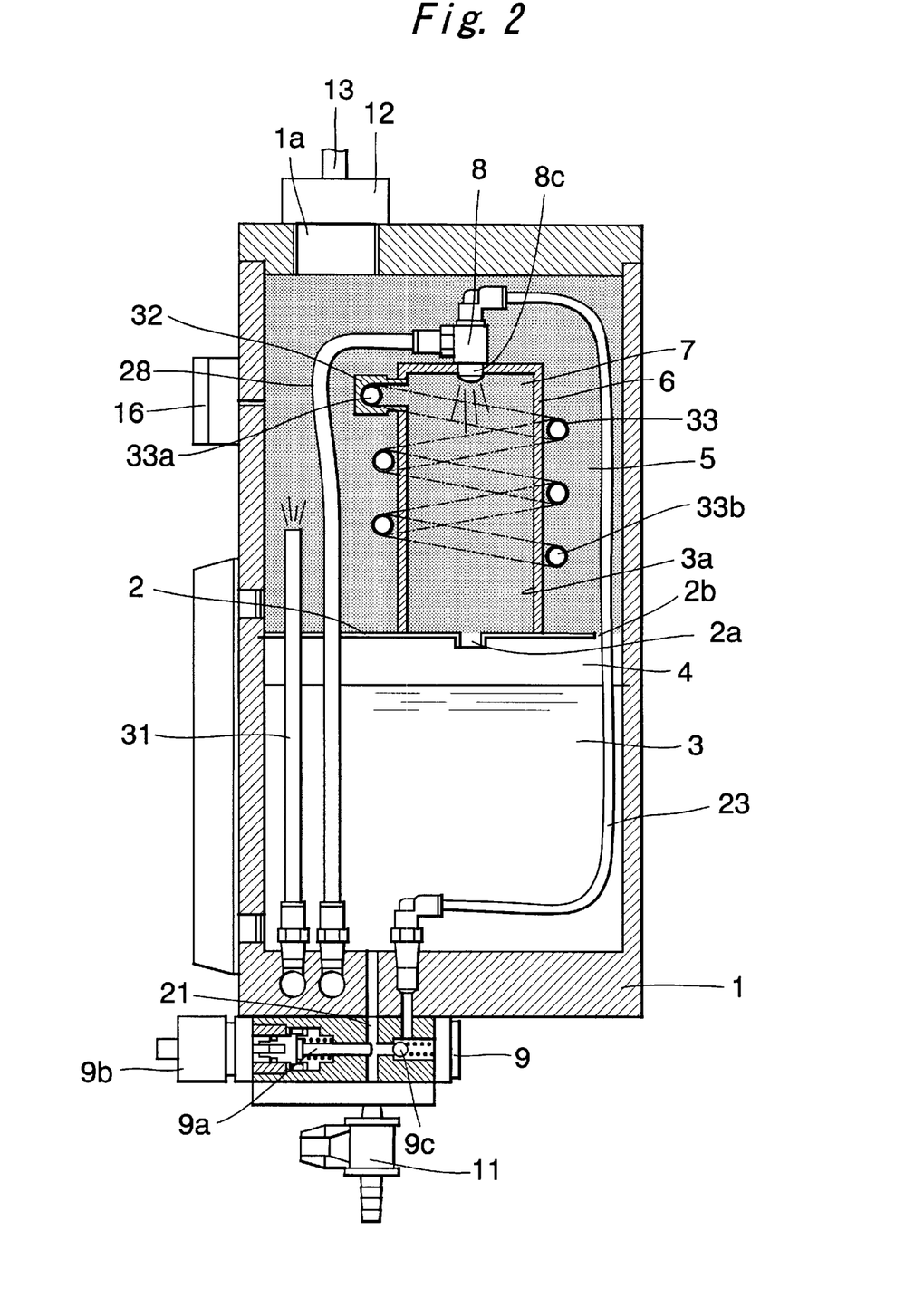
FIG. 2 is a longitudinal cross sectional view thereof.

FIG. 1 is a front view of a first embodiment of the mist supply apparatus according to the invention, and FIG. 2 is a longitudinal cross section thereof. An inner space of a main tank 1 having a substantially rectangular cylindrical shape is divided into upper and lower spaces by means of a partition plate 2. The upper space constitutes an oil chamber 4 containing an oil 3, and the upper space constitutes a main mist chamber 5. In the partition plate 2, there are formed a through hole 2a at a center and conduit holes 2b at a periphery. On the partition plate 2 is arranged an inner tank 6 at a center of the partition plate. An inner space of the inner tank 6 is communicated with the through hole 2a and constitute an inner mist chamber 7. At a top ceiling of the inner tank 6, there is provided a spray nozzle 8 for converting the oil 3 into mist with the aid of a compressed air.

On an outer surface of a bottom of the main tank 1, there is arranged a pump 9 for supplying the oil 3 into the spray nozzle 8. The pump 9 includes a plunger 9a for compressing the oil 3, an operating portion 9b for operating the plunger 9a manually or by means of a compressed air, and a check valve 9c for preventing a counterflow of the oil 3. To the pump 9 are connected a timer 10 for adjusting an exhaust frequency of the oil and a drain cock 11. The plunger 9a is operated repeatedly with a given time interval, and a given amount of the oil 3 is supplied to the spray nozzle 8 in a pulsatory manner.

In a top plate of the main tank 1 is formed a mist supply port 1a, and a connector block 12 is secured to the mist supply port 1a. To the connector block 12 is connected a mist passage 13 formed by a pipe which may be coupled with a machine tool as will be explained later. On a side wall of the main tank 1, there is provided a supplement block 1b for supplying the oil 3 into the main tank. A cap 14 is screwed to the supplement block 1b. On the main tank 1, there are further provided a liquid level meter 15 for indicating a surface level of the oil 3, a pressure gauge 15 for indicating a pressure within the main mist chamber 5 and a control knob 17 of a pressure control valve to be explained later.

Figure 3:
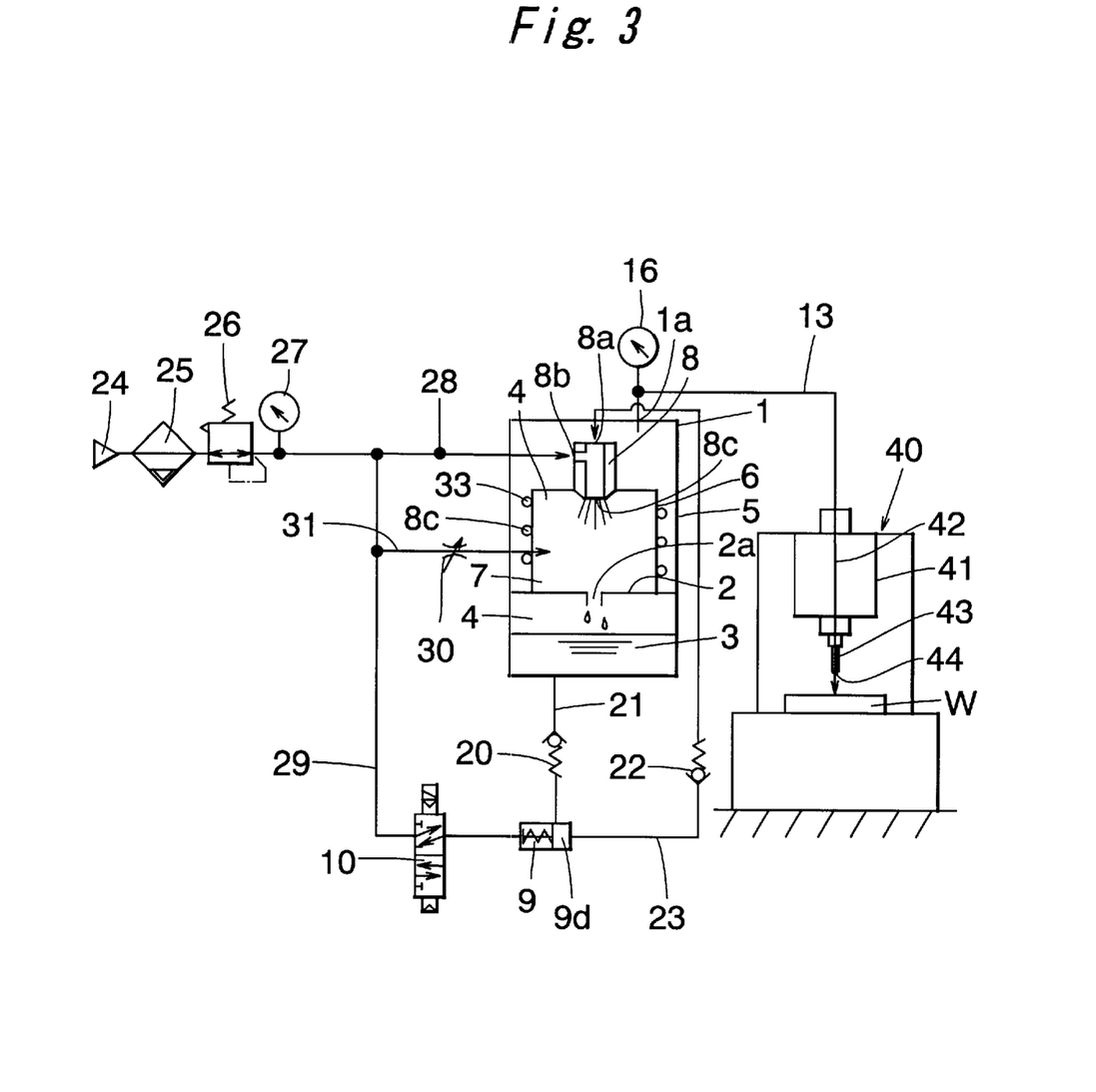
FIG. 3 is a block diagram illustrating the mist supply apparatus coupled with a machine tool.

As shown by a block diagram of FIG. 3, the oil chamber 4 and pump 9 are connected by means of an oil conduit 21 including a check valve 20, and an outlet port 9d of the pump 9 is coupled with an oil inlet port 8a of the spray nozzle 8 by means of an oil conduit 21 including a check valve 22. A compressed air supply source 24 is coupled with an air inlet port 8b of the spray nozzle 8 through air filter 25, reducing valve 26 and pressure gauge 27. The timer 10 is connected through an air conduit 29 to an air conduit 28 provided behind the pressure gauge 27, and said air conduit 29 is connected to the main mist chamber 5 by means of an air conduit 31 including a variable diaphragm 30. These air conduits 23, 28 and 31 are arranged to pass through the oil 3.

Figures 4, 5:
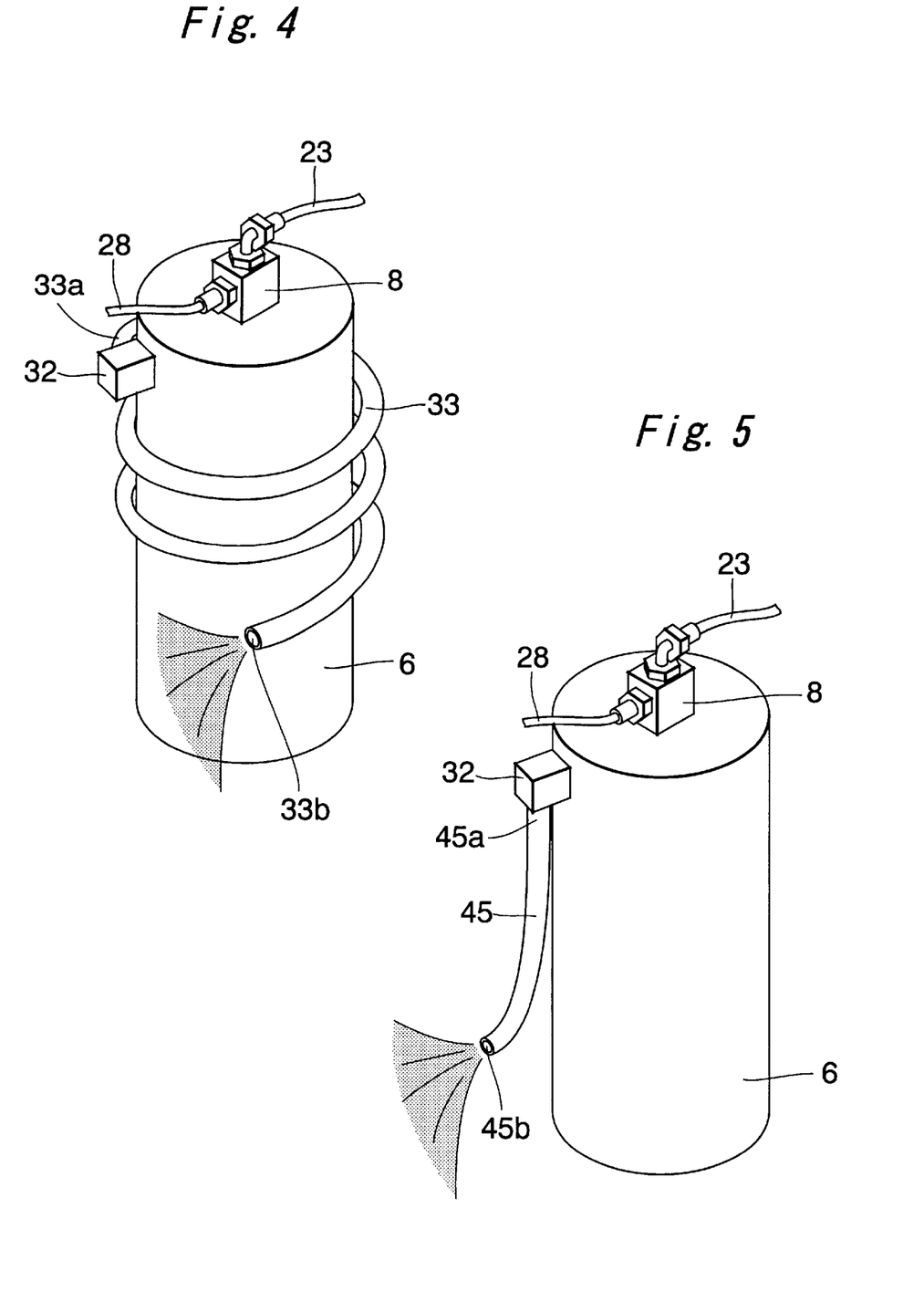
FIG. 4 is a perspective view depicting a mist separating means.
FIG. 5 is a perspective view showing a modified embodiment of the mist separating means.

As depicted in a perspective view of FIG. 4, at an upper position of an outer surface of a side wall of the inner tank 6, is arranged a connector block 32 at an upper level, and a mist separating means 33 formed by a thin helical tube is arranged on the side wall of the main mist chamber 6. An inlet port 33a of the mist separating means 33 is connected to the connector block 32 and an outlet port 33b of the mist separating means 33 is arranged at a lower position of the main mist chamber 5.

The mist supply apparatus constructed in the manner explained above is coupled with a machine tool 40 such as a machining center by means of the mist conduit 13. In this case, a mist supplied from the main mist chamber 5 into the mist conduit 13 is sprayed onto a work W through a mist conduit 42 formed in a main spindle 41 and a mist conduit 44 formed in a tool 43. As shown in FIG. 3, the pressure gauge 16 is arranged in the mist conduit 13.

A compressed air supplied from the compressed air supply source 24 is adjusted to have a suitable pressure by means of the reducing valve 26 and is supplied to the spray nozzle 8 and the timer 10. Furthermore, the compressed air having a pressure adjusted by the reducing valve 26 is converted into a low pressure air by the variable diaphragm 30, and this low pressure air is supplied to the main mist chamber 5. A given amount of the oil 3 is supplied by the pump 9 into the oil inlet port 8a of the spray nozzle 8 with a given interval. In the spray nozzle 8, the oil 3 supplied into the oil inlet port 8a and the compressed air supplied into the air inlet port 8b are mixed to produce a primary mist, and the thus produced primary mist is sprayed into the inner mist chamber 7 from a spray port 8c of the spray nozzle 8.

Within the inner mist chamber 7 filled with the primary mist, smaller mist particles in the primary mist situate in an upper portion of the inner mist chamber 7, but larger particles 3a descend toward a lower portion of the inner mist chamber 7 and are adhered onto an inner wall of the inner tank 6. Therefore, within the inner mist chamber 7, there is remained only a secondary mist substantially consisting of smaller particles. The larger particles 3a adhered onto the inner wall of the inner tank 6 are converted into liquid drops, which are supplied into the oil chamber 4 via the through hole 2a formed in the partition plate 2.

The secondary mist in the inner mist chamber 7 is sprayed at a lower position of the main mist chamber 5 by means of the connector block 12 and mist separating means 33. Since the mist separating means 33 is formed by the helical thin tube, a travelling speed of the secondary mist is accelerated during the passage through the mist separating means 33 and the secondary mist is impacted onto the inner wall of the mist separating means 33 at a high speed, and therefore larger particles in the secondary mist are liable to be adhered onto the inner wall. Moreover, the secondary mist is subjected to centrifugal force due to the helical passage, and larger particles in the secondary mist are adhered onto the inner wall of the mist separating means 33. In this manner, a tertiary mist consisting of smaller particles is sprayed into the main mist chamber 5 through the outlet port 33b. The larger particles adhered onto the inner wall of the second separating means 33 are flowed along the inner wall and are dropped into the main mist chamber 5 from the outlet port 33b.

The tertiary mist sprayed into the main mist chamber 5 is moved upward, and during this upward movement, larger particles in the tertiary mist are adhered onto the inner wall of the main tank 1 and a fourth mist consisting of almost all smaller particles is produced in an upper region of the main mist chamber 5. Larger particles dropped on the partition plate 2 are supplied to the oil chamber 4 by means of the through holes 2b. The fourth mist including only smaller particles is supplied to the machine tool 40 via the mist supply port 1a, supply block 12 and mist conduit 13, and within the machine tool 40, the fourth mist is sprayed onto the work W through the mist conduit 42 in the main spindle 41 and the mist conduit 44 in the tool 43.

As explained above, in the first embodiment, larger particles are separated from the mist successively by means of the inner mist chamber 7, mist separating means 33 and main mist chamber 5, it is possible to supply the homogenized mist consisting of only small particles. Therefore, when the mist is supplied onto the work W by means of the mist conduits 42 and 44 formed in the main spindle 41 and tool 43 which are rotated at a very high speed, the mist is scarcely adhered onto the inner walls of the mist conduits 42 and 44 and the minimum quantity lubrication can be satisfied. In this manner, the oil 3 can be positively supplied and a reduction of oil consumption can be attained.

In the present embodiment, the mist separating means 33 is formed by the helically wound thin tube, but according to the invention, as illustrated in FIG. 5, a mist separating means 45 having a straight tube whose diameter is gradually decreased from an inlet port 45a to an outlet port 45b may be used. When the secondary mist passes through such a mist separating means 45, the secondary mist is accelerated and larger particles are adhered onto the inner wall of the mist separating means 45 to produce the tertiary mist. In this manner, the same function is attained as the above mentioned embodiment. In this case, the tertiary mist sprayed from the mist separating means 45 may be ejected against a separate plate member instead of the inner wall of the main tank 1.

In the first embodiment, there is provided only one spray nozzle 8, but a plurality of spray nozzles may be arranged. The exhaust frequency of the pump 9 is adjusted by the timer 10, and the timer 10 may be controlled by a conventional means. In the above embodiment, the oil conduit 23 and air conduits 28, 31 are extended in the oil 3, but they may be arranged outside the oil 3. Furthermore, only one mist supply port 1a is provided, but a plurality of mist supply ports may be arranged.

Figure 6:
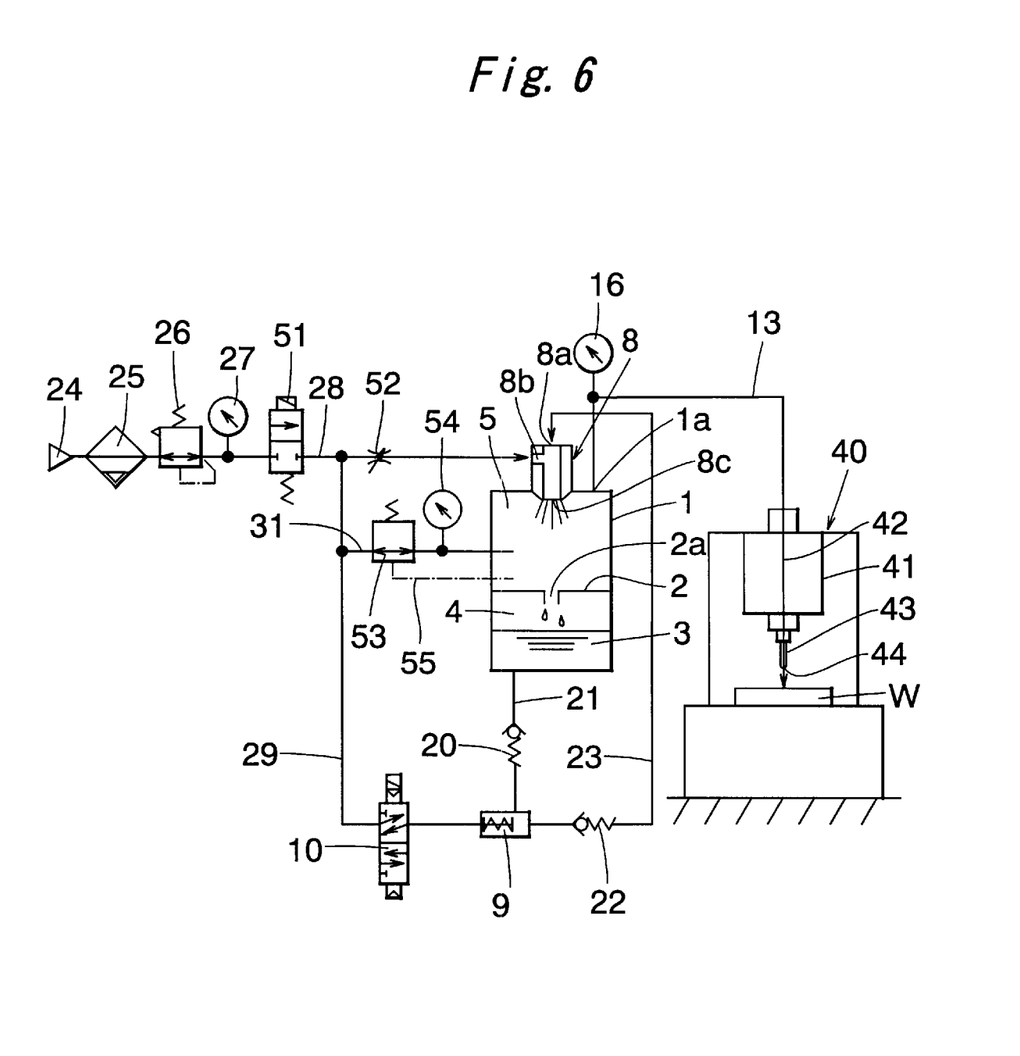
FIG. 6 is a block diagram showing a second embodiment.

FIG. 6 is a block diagram showing a second embodiment of the mist supply apparatus according to the invention, in which the inner tank 6 of the first embodiment is dispensed with and the spray nozzle 8 is secured to the top wall of the main tank 1. In the air conduit 28 there are additionally provided a two-way electromagnetic valve 51 and a variable diaphragm 52, and the air conduit 29 is separated from the air conduit 28 at a position between the two-way electromagnetic valve 51 and the variable diaphragm 52. In the air conduit 31, there are arranged a pressure control valve 53 and a pressure gauge 54 instead of the variable diaphragm 30 in the first embodiment. The pressure control valve 53 is of an external pilot type and its pilot conduit is connected to the main mist chamber 5.

Figure 7:
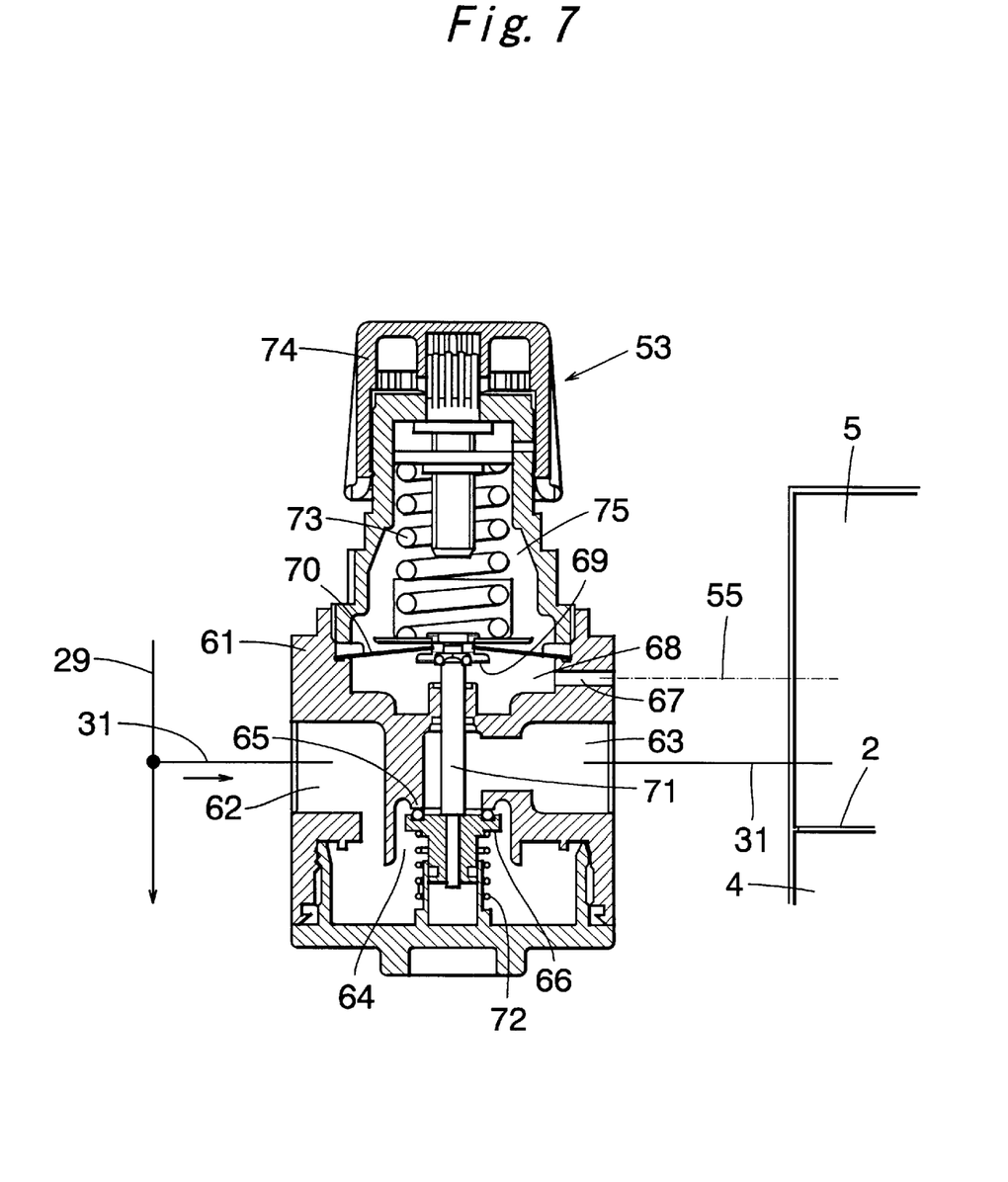
FIG. 7 is a cross sectional view illustrating a pressure control valve of external pilot type.

FIG. 7 is a cross sectional view of the pressure control valve 53. In a housing 61, there are formed an inlet port 62 for introducing the compressed air from an upstream portion of the air conduit 31, an outlet port 63 for discharging the compressed air into a downstream portion of the air conduit 31, an air conduit 64 for supplying the compressed air from the inlet port 62 into the outlet port 63, a valve body 65 for adjusting an amount of the compressed air flowing through the air conduit 64 in cooperation with a valve sheet 65, a pilot chamber 68 for introducing a secondary pressure, i.e. a pressure of the main mist chamber by means of an air conduit 55 and a pressure port 67, a diaphragm 70 which is displaced in accordance with the pressure in the pilot chamber 68 and has a relief valve 69 provided integrally therewith, a valve rod 71 secured to the valve body 66 for driving the relief valve 69 in an on-off manner, a supporting spring 72 for supporting the valve body 66, a pressure adjusting spring 73 for adjusting a bias force of the diaphragm 70, an adjusting knob 74 for manually adjusting a bias force of the pressure adjusting sprint 73, a relief chamber 75 for relieving air through the relief valve 69, and so on.

When the two-way valve 51 is initiated, the primary mist is sprayed from the spray port 8c of the spray nozzle 8 into the main mist chamber 5 like as the first embodiment. In this case, the pressure inside the main mist chamber 5 is transferred to the pressure control valve 53 by means of the pilot conduit 55. In the pressure control valve 53, the pressure transmitted through the pilot conduit 55 is supplied into the pilot chamber 68 through the pressure port 67, and thus the diaphragm 70 is displaced upward against the bias force by the pressure adjusting spring 73. Then, the valve body 66 is urged against the valve sheet 65 by the bias force of the supporting spring 72 to adjust the pressure inside the main mist chamber 5 into a given value, and the mist is sprayed onto the work W under the given pressure by means of the mist conduits 13, 42 and 44. In this case, by rotating the adjusting knob 74, it is possible to increase or decrease the mist pressure sprayed from the mist conduit 44 formed in the tool 43.

When the tool 43 is exchanged by a tool 43 having a mist conduit 44 of a smaller diameter, the flow of the mist is restricted by the mist conduit 44 of the tool 43 and the pressure inside the main mist chamber 5 is temporally increased. Then, the increased pressure inside the main mist chamber 5 is transferred to the pilot chamber 68 and the diaphragm 70 is displaced upward against the bias force of the pressure adjusting spring 73. Therefore, the relief valve 69 is separated from the valve rod 71 and the compressed air inside the pilot chamber 68 is relieved into the relief chamber 75. In this manner, the pressure inside the main mist chamber 5 is returned into the given value.

When the tool 43 is replaced by a tool 43 having a mist conduit 44 of a larger diameter such as deep hole drill, tap drill and so on, the pressure inside the main mist chamber 5 is temporally decreased because the mist flow is relieved by the larger mist conduit 44 of the tool 43. In this case, the pressure inside the main mist chamber 5 is transferred to the pilot chamber 68 of the pressure control valve 53 via the air conduit 55 and the diaphragm 70 is displaced downward by the bias force of the pressure adjusting spring 73. Then, the valve body 66 is separated from the valve sheet 65 and the compressed air is supplied into the main mist chamber 5 through the air conduit 64, and the pressure inside the main mist chamber 5 is returned into the given value.

In this manner, in the second embodiment, since the mist supply pressure from the tool 43 is controlled into a given value by introducing the compressed air from the compressed air supply source 24 into the main mist chamber 5 by means of the pressure control valve 53, although a diameter of the mist conduit 44 formed in the tool 43 is changed in accordance with the exchange of the tool in the machine tool 40, the mist can be sprayed from the tool 43 under a given pressure. Therefore, the good cooling faculty and lubrication faculty can be maintained, and the faculty for removing cut chips or debris is not lost.

Figure 8:
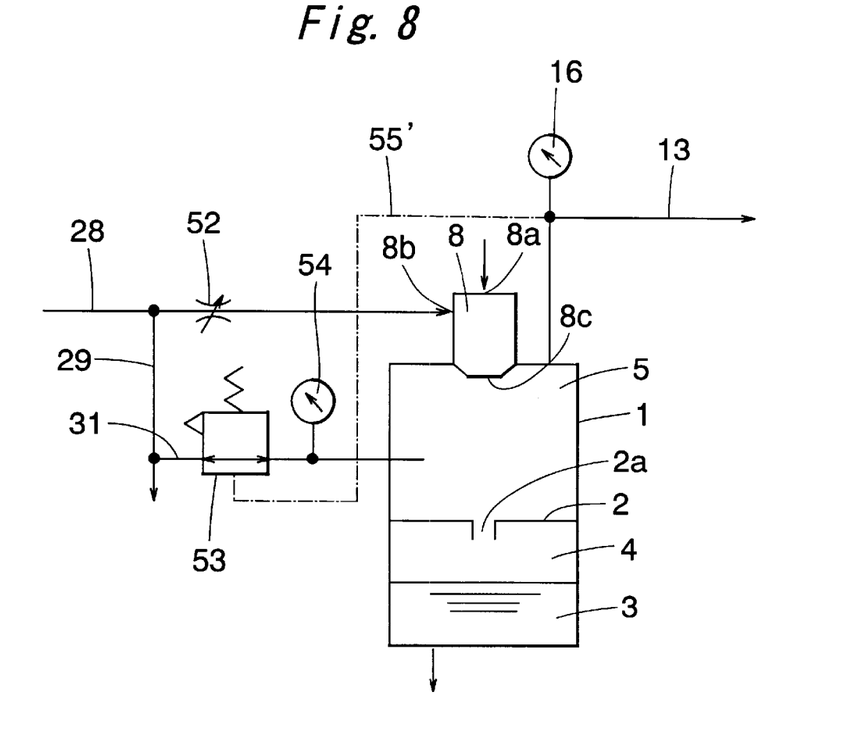
FIG. 8 is a partial block diagram showing a modified embodiment of a pilot path.
Figure 9:
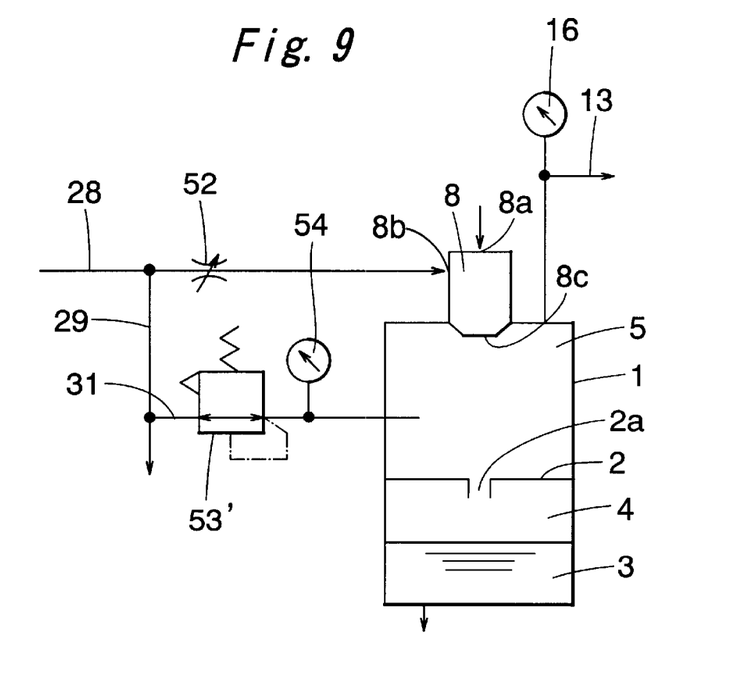
FIG. 9 is a partial cross sectional view of an application using a pressure control valve of inner pilot type.
Figure 10:
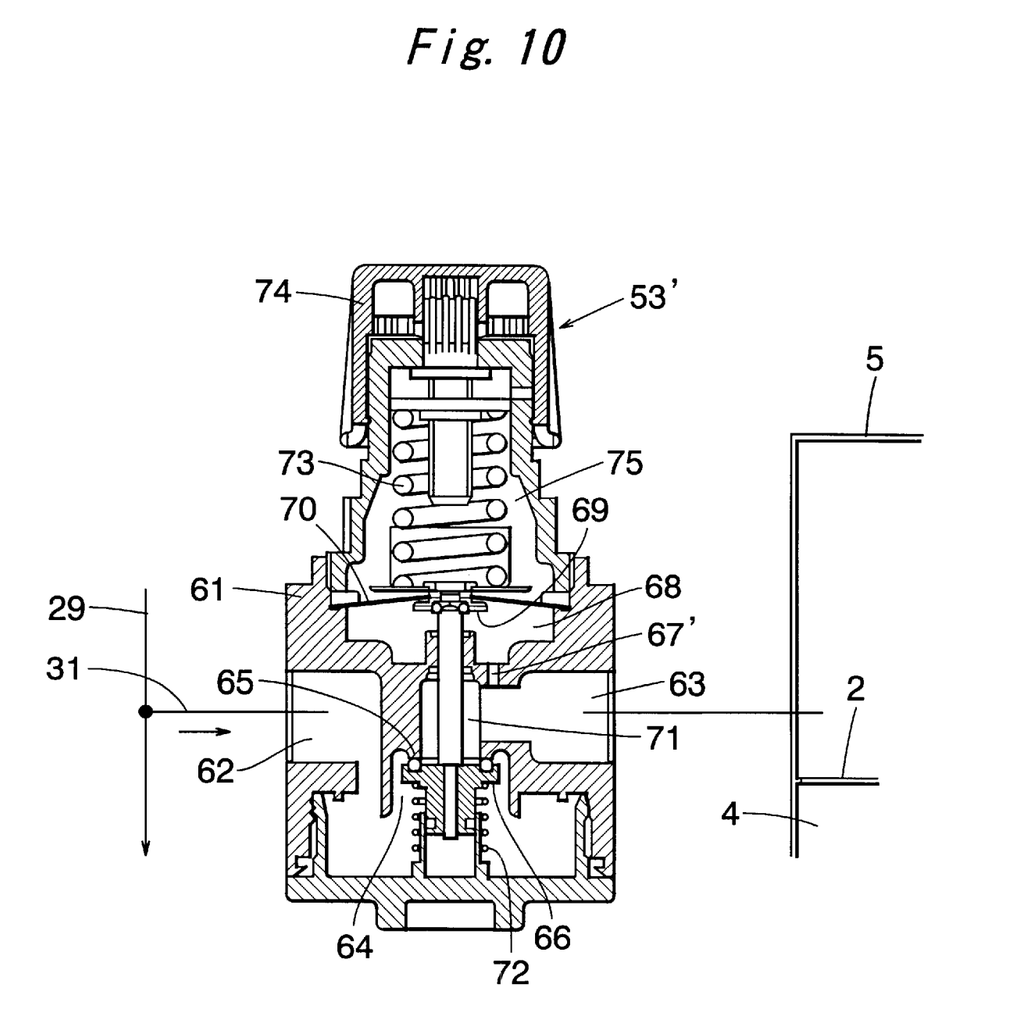
FIG. 10 is a cross sectional view depicting a pressure control valve of internal pilot type.
Figure 11:
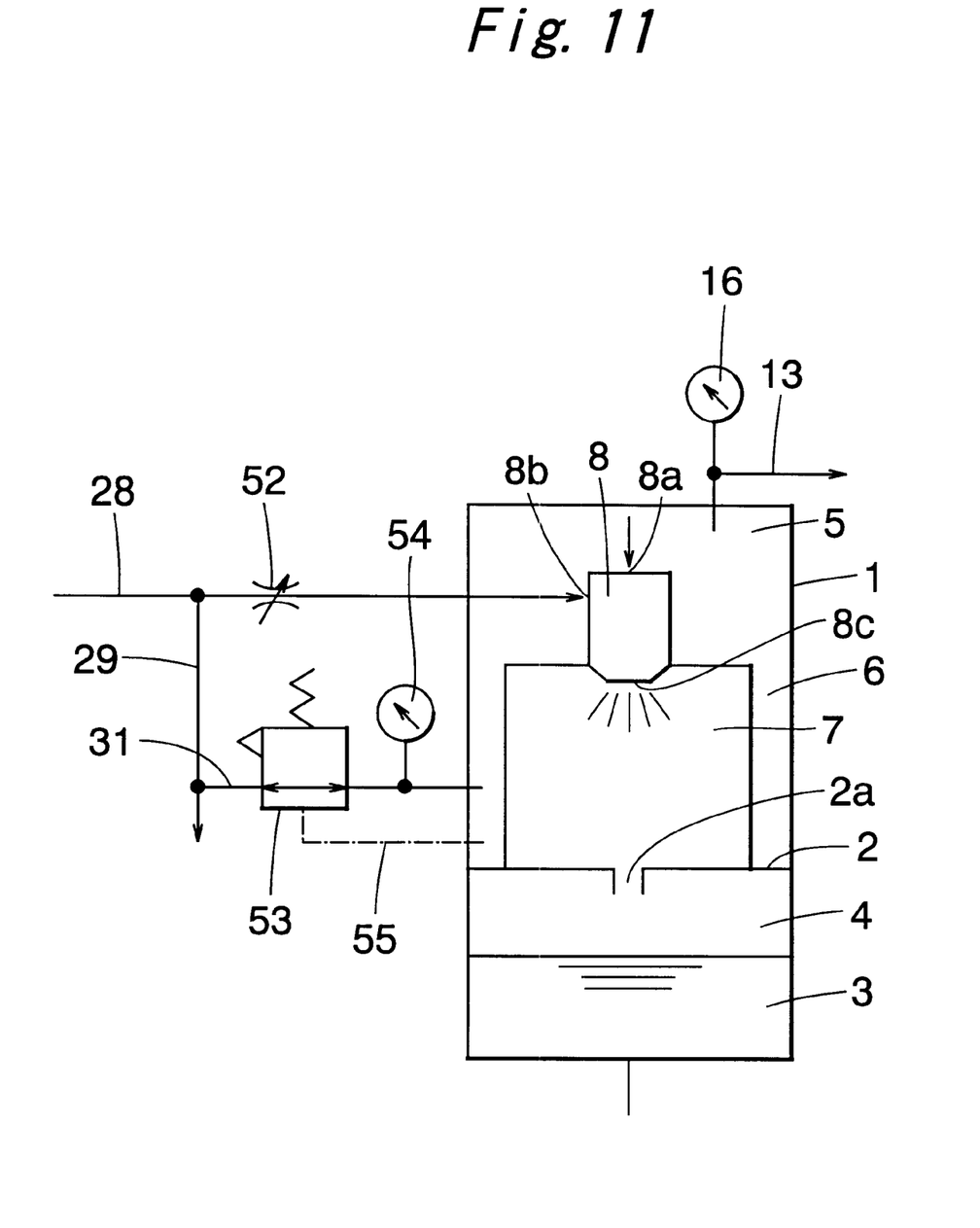
FIG. 11 is a partial cross sectional view illustrating an application using an inner tank.

It should be noted that in the second embodiment, the pressure is supplied from the main mist chamber 5 into the pressure control valve 53 by means of the pilot conduit 55, but the pressure control resembling much more the actual variation in the mist pressure can be performed by introducing the pressure from the mist conduit 13 via a pilot conduit 55' as illustrated in a partial block diagram of FIG. 8. Furthermore, as shown by a partial block diagram of FIG. 9 as well as a cross sectional view of FIG. 10, instead of the external pilot type pressure control valve 53, use may be made of an internal pilot type pressure control valve 53' having a pressure port 67' within the valve. In this case, the pilot conduit 55 can be dispensed with. It is matter of course that as depicted in a partial block diagram of FIG. 11, the pressure control valve may be applied to the apparatus including the inner tank 6 similar to the first embodiment.

Figure 12:
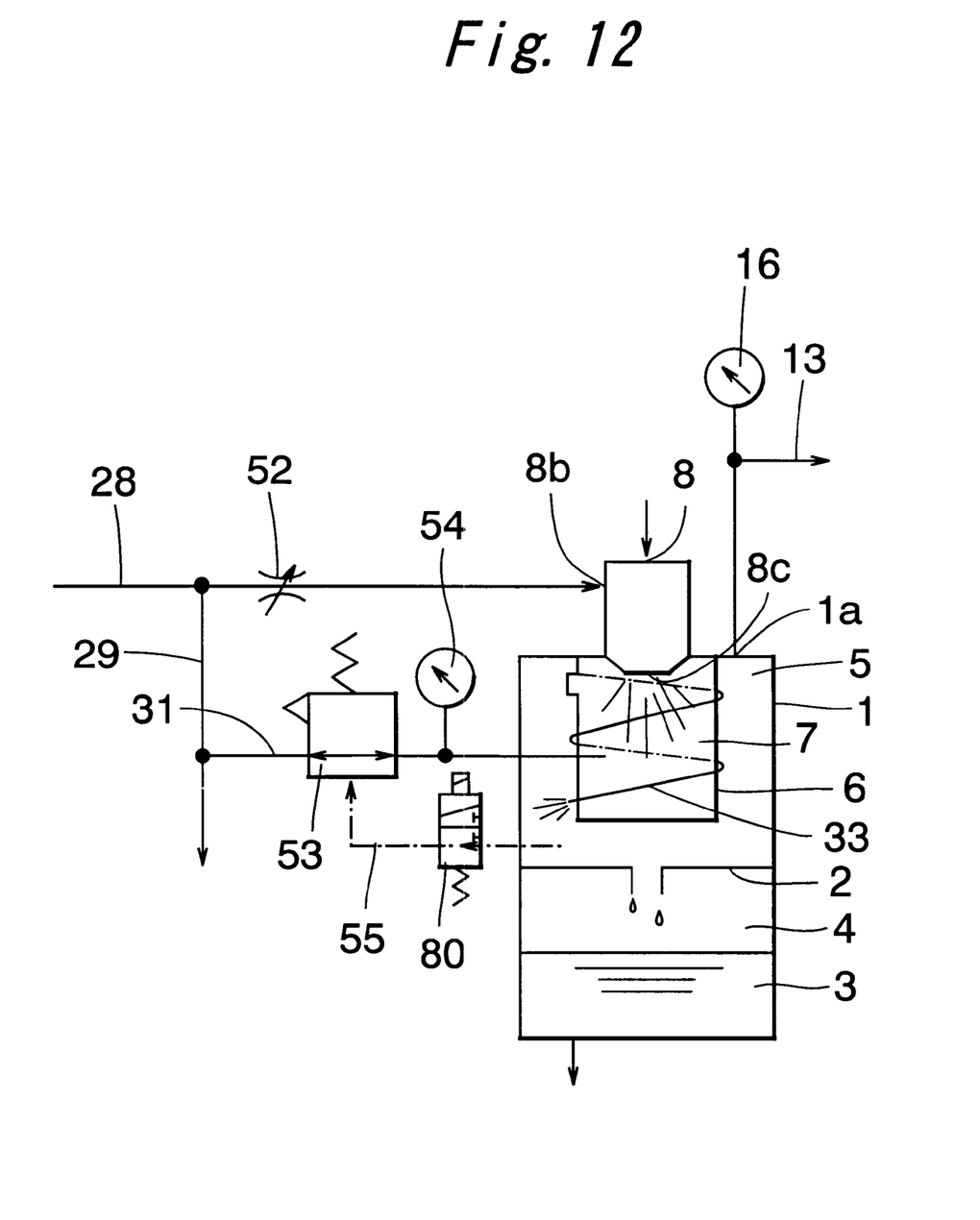
FIG. 12 is a partial block diagram depicting a third embodiment.

FIG. 12 is a partial block diagram showing a third embodiment which is substantially a combination of the first and second embodiments. The pressure control valve 53 having a similar function of the second embodiment is provided, and a second reducing valve 80 is provided in the pilot conduit 55 in order to discharge the inside pressure into the atmosphere. The inner tank 6 is secured on the top plate of the main tank 1, the air conduit 31 is connected to the inner mist chamber 7, and the pilot conduit 55 is connected to the main mist chamber 5. The second reducing valve 80 may be formed by, for instance a three-way electromagnetic valve which is controlled by, for instance a command signal for removing cut chips from a control means of the machine tool 40.

In the third embodiment, upon removing the cut chips after treating the word W, its command signal is supplied to the second reducing valve 80 and the compressed air in the pilot conduit 55 is discharged into the atmosphere. Then, the pressure control valve 53 is driven into the full-open state, and the compressed air from the compressed air supply source is introduced into the inner mist chamber 7. Therefore, the pressure inside the inner mist chamber 7 and main mist chamber 5 is increased abruptly to increase an amount of mist sprayed from the tool 43.

Figure 13:
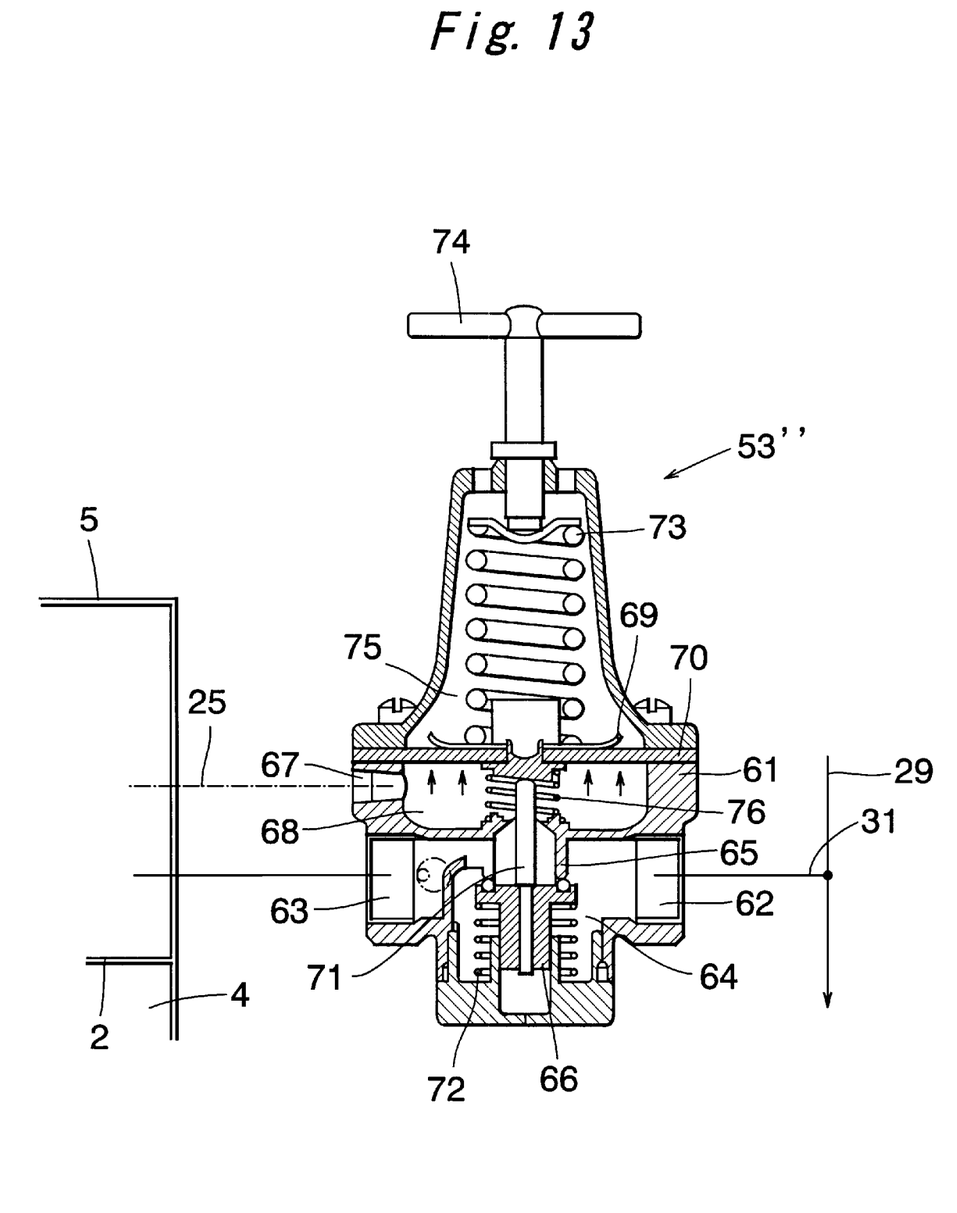
FIG. 13 is a cross sectional view showing a pressure control valve of a modification of the third embodiment.

FIG. 13 is a cross sectional view illustrating a pressure control valve 53" used in a modification of the above mentioned third embodiment. To the pressure control valve 53 used in the third embodiment shown in FIG. 12, there are added a pressure difference producing spring 76 for generating a pressure difference by biasing the diaphragm 70 toward the pressure adjusting spring 73. A bias force of the pressure difference producing spring 76 is smaller than that of the pressure control spring 73 to control an amount of the movement of the valve body 66.

For instance, in order to make the cut chip removing treatment easy during the deep hole machining, a step movement is adopted. In this case, the mist has to be supplied under a higher pressure than the normal operation. When the conventional pressure control valve 53 is provided like as the third embodiment, the pressure inside the inner mist chamber 7 and main mist chamber 5 is increased abruptly and the cut chips can be removed effectively. However, the pressure inside the inner mist chamber 7 becomes identical with the pressure of the compressed air supplied from the compressed air supply source 24 and the production of mist might be difficult.

In the modification of the third embodiment, the mist can be produced positively even in the deep hole machining. When a command signal for the movement of the main spindle 41 of the machine tool 40 is supplied to the second reducing valve 80, the conduit of the second reducing valve 80 is changed to discharge the compressed air within the pilot conduit 55 and pilot chamber 68 into the atmosphere. Therefore, the diaphragm 70 is displaced toward the pilot chamber 68 by the bias force of the pressure control spring 73, and the valve body 66 tends to be driven into the fully opened condition.

However, since the pressure difference generating spring 76 restricts a large displacement of the diaphragm 70, the valve body 66 is stopped at a position immediately before the full open position. Under this condition, the compressed air flows into the inner mist chamber 7 in accordance with an opened space of the valve body 66, and the pressure inside the inner mist chamber 7 is increased to increased the mist supply pressure. In this case, since the valve body 66 is not in the full open position due to the bias force of the pressure difference generating spring 76, there is produced a pressure difference between the air inlet port 8b and the spray port 8c of the spray nozzle 8 to produce the mist continuously. Therefore, the mist can be supplied to the work W even in the deep hole machining.

After a given time, when the work W has been machined, a command signal is supplied to the second reducing valve 80 from the machine tool 40 or manually, the second reducing valve 80 is changed its position to communicate the pilot chamber with the main mist chamber 5, and the pressure inside the main mist chamber 5 is supplied to the pilot chamber 68 of the pressure control valve 53" to set the pilot chamber 68 to a given pressure and the mist supply pressure is kept at a given value.

In this manner, in the modification of the third embodiment, the mist can be positively supplied in the deep hole machining, in which the mist has to be supplied with a high pressure for a given time period.

Figure 14:
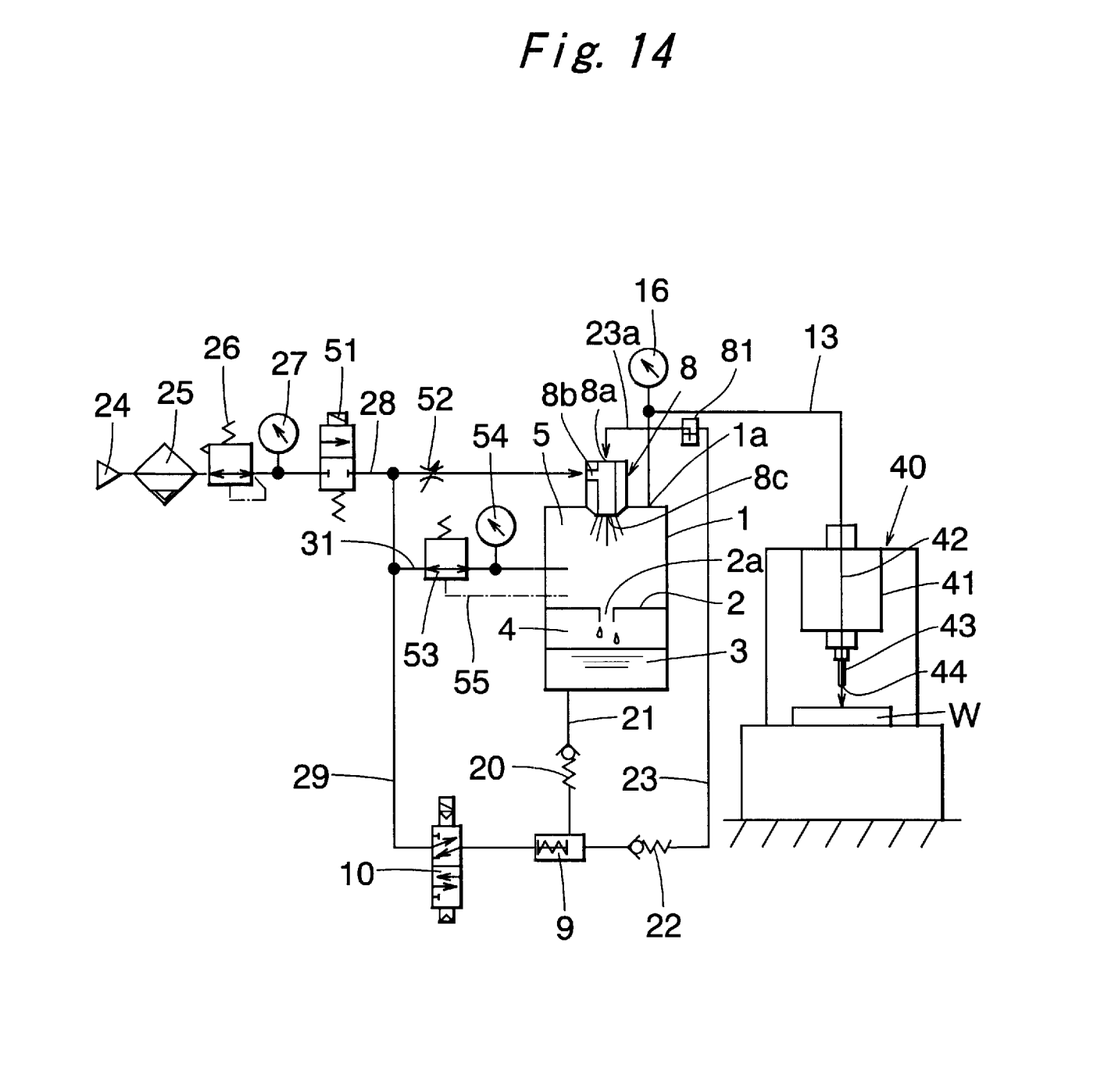
FIG. 14 is a block diagram showing a fourth embodiment.
Figure 15:
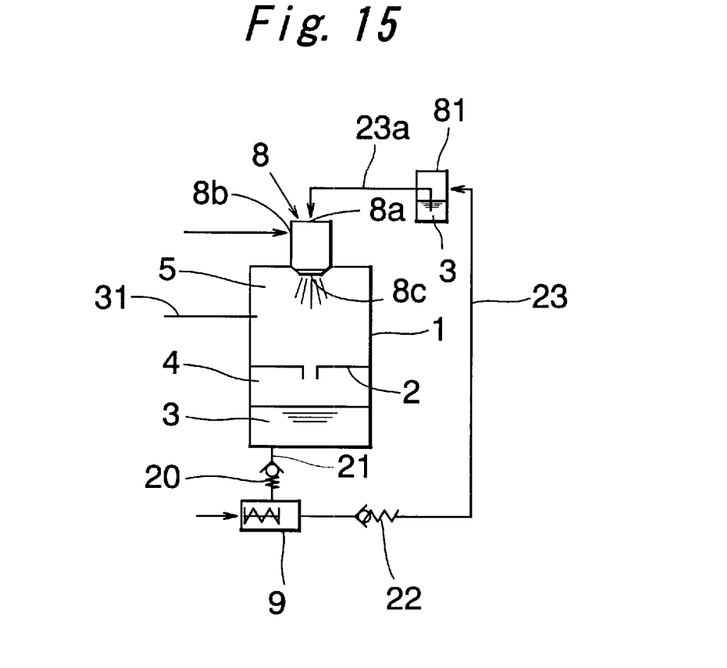
FIG. 15 is partially enlarged block diagram.

FIG. 14 is a block diagram and FIG. 15 is a partially enlarged block diagram of a fourth embodiment, in which in addition to the structure of the second embodiment is provided a sub-tank 81 in the oil conduit 23. This sub-tank 81 is connected to the spray nozzle 8 by means of an oil conduit 23a formed by a siphon tube. One end of the oil conduit 23a is immersed into the oil 3 contained in the sub-tank 81 and the other end is connected to the oil inlet port 8a of the spray nozzle 8. Then, the oil 3 in the sub-tank 81 is continuously supplied from the sub-tank 81 to the spray nozzle 8 by the siphon phenomenon.

When the two-way electromagnetic valve 51 is initiated and the pump 9 is driven, a given amount of the oil 3 is introduced from the oil chamber 4 into the sub-tank 81 with a given interval, and after that the oil is supplied continuously to the spray nozzle 8 via the oil conduit 23a under the siphon phenomenon. Like as the second embodiment, the primary mist is ejected from the spray port 8c into the main mist chamber 5.

When a tool 43 having a mist conduit 44 of a larger diameter is used, the mist flow is relieved by the mist conduit 44 of the tool 43, and the pressure inside the main mist chamber 5 is temporally reduced. However, the pressure inside the main mist chamber 5 is transferred to the pressure control valve 53 and the pressure inside the main mist chamber 5 is returned into a given value. In this case, the pump 9 exhausts temporally a large amount of the oil and an excessive amount of the oil 3 is temporally stored in the sub-tank 81. After that, the oil 3 in the sub-tank 81 is supplied continuously to the spray nozzle 8 under the siphon phenomenon.

In the manner explained above, in the fourth embodiment, even if the oil 3 in the oil tank 4 is intermittently supplied into the sub-tank 81 by the operation of the pump 9, the oil 3 in the sub-tank 81 is continuously supplied to the spray nozzle 8 under the siphon phenomenon. Therefore, even if a discharge amount of the pump 9 is increased abruptly, a total amount of the oil 3 is temporally stored in the sub-tank 81 and then is supplied continuously to the spray nozzle 8 at a constant rate.

In this manner, in the fourth embodiment, a large amount of the oil 3 is not supplied to the spray nozzle 8 abruptly and the oil is not dropped off the spray nozzle 8 without being atomized. Moreover, the spray nozzle 8 can supply the mist always with a suitable concentration, and this embodiment is preferably applied to the machine tool 40 performing the deep hole machining and tap machining.

Figure 16:
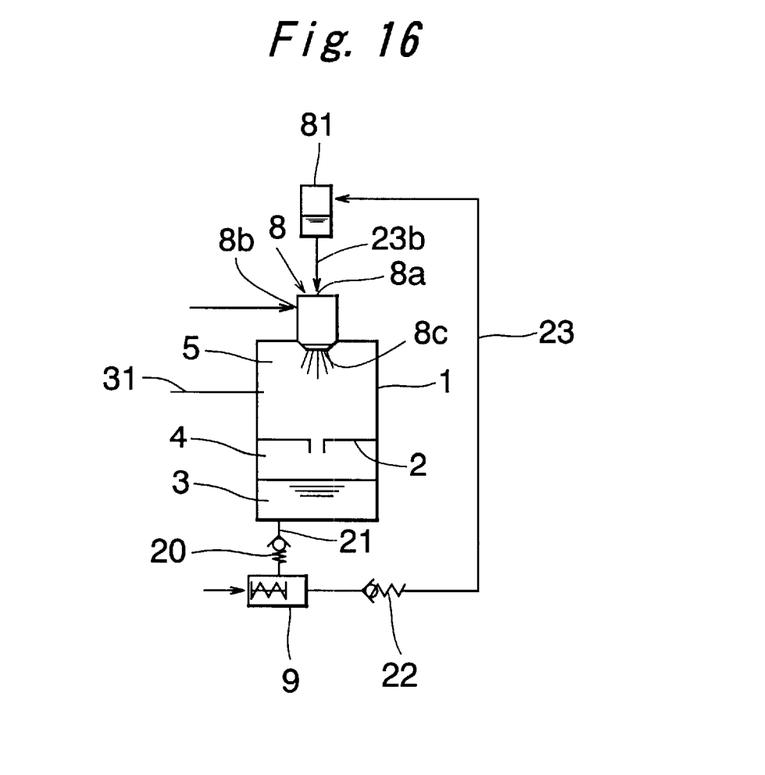
FIG. 16 is a partially enlarged block diagram showing a modified embodiment of a sub-tank.

It should be noted that the sub-tank 81 my be arranged above the spray nozzle 8 as shown in FIG. 16. In this case, the sub-tank 81 and spray nozzle 8 may be mutually connected by means of a conventional oil conduit 23b instead of the siphon tube, and the oil 3 contained in the sub-tank 81 is continuously supplied to the spray nozzle 8 under the gravity. In this manner, a similar function to that explained above can be attained.

INDUSTRIAL APPLICABILITY

In the mist supply apparatus according to the invention, larger particles in the primary mist produced by the atomizing means are separated by the first separating means constituted by a space to produce the secondary mist, larger particles in the secondary mist are removed by the second separating means constituted by the tubular body to produce a tertiary mist consisting of smaller particles. In this manner, the mist consisting of smaller homogeneous particles can be supplied.

Furthermore, in the mist supply apparatus according to the invention, since the mist supply pressure can be adjusted by providing the pressure control valve in the communication conduit between the compressed air supply source and the mist chamber, even when the tools having mist conduits of different diameters are exchanged in the machine tool, the good cooling and lubricating faculty can be maintained and the cut chip removing faculty is not lost by maintaining a given mist supply pressure by means of the pressure control valve. Moreover, by increasing the mist supply pressure temporally with the aid of the pressure control valve, the cut chip removing faculty can be effectively maintained during the deep hole machining.

Furthermore, in the mist supply apparatus according to the invention, since the sub-tank is provided in the conduit flowing the liquid from the tank to the atomizing means, even when an amount of the liquid is increased, the liquid is once stored in the sub-tank, and after that the liquid is supplied from the sub-tank to the atomizing means continuously. In this manner, an excessive amount of the liquid could not be supplied to the atomizing means abruptly. Therefore, the atomizing means can always produce the mist having a suitable concentration, and the apparatus can be easily applied to machine tools which require a mist of a high concentration.

What is claimed is:

1. A mist supply apparatus comprising a liquid tank for containing a liquid, an atomizing means for atomizing said liquid to produce a mist of said liquid, and a transporting means for transporting said mist produced by said atomizing means to a mist supply port, wherein the apparatus further comprises a first separating means consisting of a space for containing a primary mist produced by said atomizing means and for separating larger particles in the primary mist by depositing the larger particles on an inner wall defining said space of the first separating means, and a second separating means consisting of a helical tube conduit arranged to surround said first separating means and conducting a secondary mist produced by said first separating means and for separating larger particles contained in the secondary mist by depositing the large particles on an inner wall of said tubular body of the second separating means.

2. The mist supply apparatus according to claim 1, wherein said first separating means is arranged above said liquid tank, and said larger particles separated from the primary mist are returned into the liquid tank.

3. The mist supply apparatus according to claim 1, wherein said second separating means is formed by a conduit whose diameter is increased toward an outlet port.

4. A mist supply apparatus comprising a liquid tank for containing a liquid, an atomizing means for atomizing said liquid from said liquid tank, a mist chamber for containing mist produced by said atomizing means, a compressed gas supply source for supplying compressed air, a branched air conduit for supplying said compressed air from said compressed air supply source to said mist chamber, said branched air conduit including two air conduits for supplying said compressed air from said compressed air supply source to said mist chamber, one of said two air conduit supplying said compressed air from said compressed air supply source to said mist chamber through a pressure control valve, and a feed-back mechanism for monitoring and adjusting an inner pressure of said mist chamber at a given pressure.

5. The mist supply apparatus according to claim 4, wherein said mist chamber includes an inner mist chamber and an external mist chamber, and after containing the mist produced by said atomizing means in the inner mist chamber, the mist is contained in said external mist chamber by means of a tube conduit.

6. The mist supply apparatus according to claim 4, wherein said pressure control means has a control faculty for adjusting the mist supply pressure to a given value and an additional faculty for increasing the mist supply pressure temporally.

7. The mist supply apparatus according to claim 4, wherein said pressure control means is of an external pilot type.

8. The mist supply apparatus according to claim 4, wherein said pressure control means of an internal pilot type.

9. The mist supply apparatus according to claim 7, wherein said pressure control means is constructed such that a pilot input pressure is introduced from the mist chamber.

10. The mist supply apparatus according to claim 7, wherein said pressure control means is constructed such that a pilot input pressure is introduced from a mist conduit connected to said mist chamber.

11. The mist supply apparatus according to claim 7, wherein said pressure control means includes a control valve for controlling said pilot input pressure.

12. The mist supply apparatus according to claim 7, wherein said pressure control means includes a restricting means for restricting a full open condition even under a zero pilot input pressure.

13. The mist supply apparatus according to claim 7, wherein said restricting means includes a compressed spring for biasing a diaphragm toward a pressure control spring.

14. A mist supply apparatus comprising an external tank for containing a liquid, an atomizing means for atomizing said liquid from said liquid tank by means of a gas from a compressed gas supply source to produce a mist of said liquid, and a transporting means for transporting said mist produced by said atomizing means to a mist supply port, wherein the apparatus further comprises a first separating means including an inner tank containing the mist produced by said atomizing means, and a second separating means including a helical tube supplying the mist from the inner tank to the external tank, and the compressed air from said compressed gas supply source is introduced into said external tank and said mist supply port is provided at an upper portion of said external tank.

15. A mist supply apparatus comprising a liquid tank for containing a liquid, an atomizing means for atomizing said liquid from said liquid tank by means of a gas from a compressed gas supply source to produce a mist of said liquid, and a mist chamber for containing the mist produced by said atomizing means, wherein a sub-tank for containing the liquid is provided in a liquid conduit supplying the liquid from said liquid tank to said atomizing means by means of a pump means, and the liquid is continuously flowed between said sub-tank and said atomizing means.

16. The mist supply apparatus according to claim 15, wherein the liquid in said sub-tank is supplied to said atomizing means under a siphon phenomenon.

17. The mist supply apparatus according to claim 15, wherein the liquid in said sub-tank is supplied to said atomizing means under gravity.

* * * * *